US010633808B2

(12) United States Patent
Bowman et al.

(10) Patent No.: US 10,633,808 B2
(45) Date of Patent: Apr. 28, 2020

(54) ROBOTIC BRIDGING SYSTEM

(71) Applicant: Eagle Technology, LLC, Melbourne, FL (US)

(72) Inventors: Michael E. Bowman, Satellite Beach, FL (US); Robert Meehan, Melbourne, FL (US); Paul M. Bosscher, West Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 16/144,689

(22) Filed: Sep. 27, 2018

(65) Prior Publication Data
US 2020/0102709 A1 Apr. 2, 2020

(51) Int. Cl.
*E01D 15/12* (2006.01)
*E01D 15/00* (2006.01)
(Continued)

(52) U.S. Cl.
CPC ............ *E01D 15/127* (2013.01); *B25J 9/162* (2013.01); *E01D 15/005* (2013.01);
(Continued)

(58) Field of Classification Search
CPC ....... E01D 21/06; E01D 18/00; E01D 15/127; E01D 15/005; E01D 15/124; B25J 9/162;
(Continued)

(56) References Cited

U.S. PATENT DOCUMENTS 534,704 A * 2/1895 Worden ................ B65G 69/22
14/37
3,580,404 A * 5/1971 Moser ...................... B60P 1/43
414/537
(Continued)

FOREIGN PATENT DOCUMENTS

FR 2608186 A1 6/1988

OTHER PUBLICATIONS

Choi, K.H., et al., "Obstacle Negotiation for the Resue Robot with Variable Single-Tracked Mechanism," IEEE/ASME International Conference on Advanced Intelligent Mechatronics, pp. 1-6, 1-4244-1264-1/07 copyright 2007 IEEE.
(Continued)

*Primary Examiner* — Abigail A Risic
(74) *Attorney, Agent, or Firm* — Fox Rothschild LLP; Robert J. Sacco; Carol E. Thorstad-Forsyth

(57) ABSTRACT

UGV bridging system includes a first end of a first elongated span of a hinged bridge structure disposed on a deployment support bracket which is secured to a UGV. A second elongated span is hingedly supported at a second end of the first elongated span opposed from the first end. A tension element applies a tension force to the first elongated span at a location intermediate the first and second ends. The tension force secures the first elongated span in a stowed position adjacent the deployment support bracket. A retention element associated with the deployment support bracket prevents the second elongated span from rotating about the hinge axis in response to a spring bias force. Deployment
(Continued)

involves pivoting the first elongated span and concurrently releasing the second elongated span from the retention element in response to the extending.

20 Claims, 13 Drawing Sheets

(51) Int. Cl.
| | |
|---|---|
| *E01D 21/06* | (2006.01) |
| *B25J 9/16* | (2006.01) |
| *E01D 18/00* | (2006.01) |
| *E01D 15/127* | (2006.01) |

(52) U.S. Cl.
CPC ........... *E01D 15/124* (2013.01); *E01D 21/06* (2013.01); *E01D 18/00* (2013.01); *G05B 2219/40298* (2013.01)

(58) Field of Classification Search
CPC .... B65G 69/30; B65G 69/28; B65G 69/2811; B65G 69/2941
See application file for complete search history.

(56) References Cited

U.S. PATENT DOCUMENTS

| | | | | | |
|---|---|---|---|---|---|
| 4,133,067 | A | * | 1/1979 | Bennett | E01D 15/24 14/71.3 |
| 4,214,546 | A | * | 7/1980 | Jochum | E01D 15/22 14/71.7 |
| 4,411,036 | A | * | 10/1983 | Fitzgerald-Smith | E01D 15/127 14/2.4 |
| 4,534,079 | A | * | 8/1985 | Tucker | E01D 15/124 14/14 |
| 4,602,399 | A | * | 7/1986 | Jenkins | E01D 15/127 14/2.4 |
| 4,853,998 | A | * | 8/1989 | Bernard | E01D 15/127 14/2.4 |
| 5,067,191 | A | * | 11/1991 | Kinzel | E01D 15/127 14/2.4 |
| 5,276,930 | A | * | 1/1994 | Parramore | E01D 15/127 14/2.5 |
| 5,457,836 | A | * | 10/1995 | Wiedeck | E01D 15/127 14/14 |
| 5,617,598 | A | | 4/1997 | Kinzel et al. | |
| 5,937,468 | A | * | 8/1999 | Wiedeck | E01D 15/127 14/2.4 |
| 6,076,215 | A | * | 6/2000 | Blankenship | B60P 1/43 14/69.5 |
| 6,725,487 | B2 | * | 4/2004 | Myrick | B60P 1/43 14/69.5 |
| 7,174,591 | B2 | | 2/2007 | Bertrand et al. | |
| 7,543,347 | B2 | * | 6/2009 | Green | E01D 15/127 14/2.4 |
| 8,302,235 | B1 | * | 11/2012 | Bailie | B60P 1/43 14/69.5 |
| 9,670,013 | B2 | * | 6/2017 | Parrish | B60P 3/40 |
| 9,844,990 | B2 | | 12/2017 | Hobart et al. | |
| 10,179,979 | B1 | * | 1/2019 | Tamisiea | E01D 15/127 |
| 2003/0213072 | A1 | * | 11/2003 | Myrick | B60P 1/43 14/69.5 |
| 2006/0117502 | A1 | * | 6/2006 | Lensing | B65G 69/30 14/69.5 |
| 2009/0064427 | A1 | | 3/2009 | Emrich | |
| 2012/0137862 | A1 | | 6/2012 | Kossett et al. | |
| 2015/0354152 | A1 | * | 12/2015 | Fraundorfer | E01D 15/12 14/2.4 |

OTHER PUBLICATIONS

Brill, A., et al., "Tail-Assisted Rigid and Compliant Legged Leaping," 2015 IEEE/RSJ International Conference on Intelligent Robots and Systems, Jan. 2015.

Extended European Search Report dated Feb. 20, 2020 in European Patent Application No. 19194071.7.

* cited by examiner

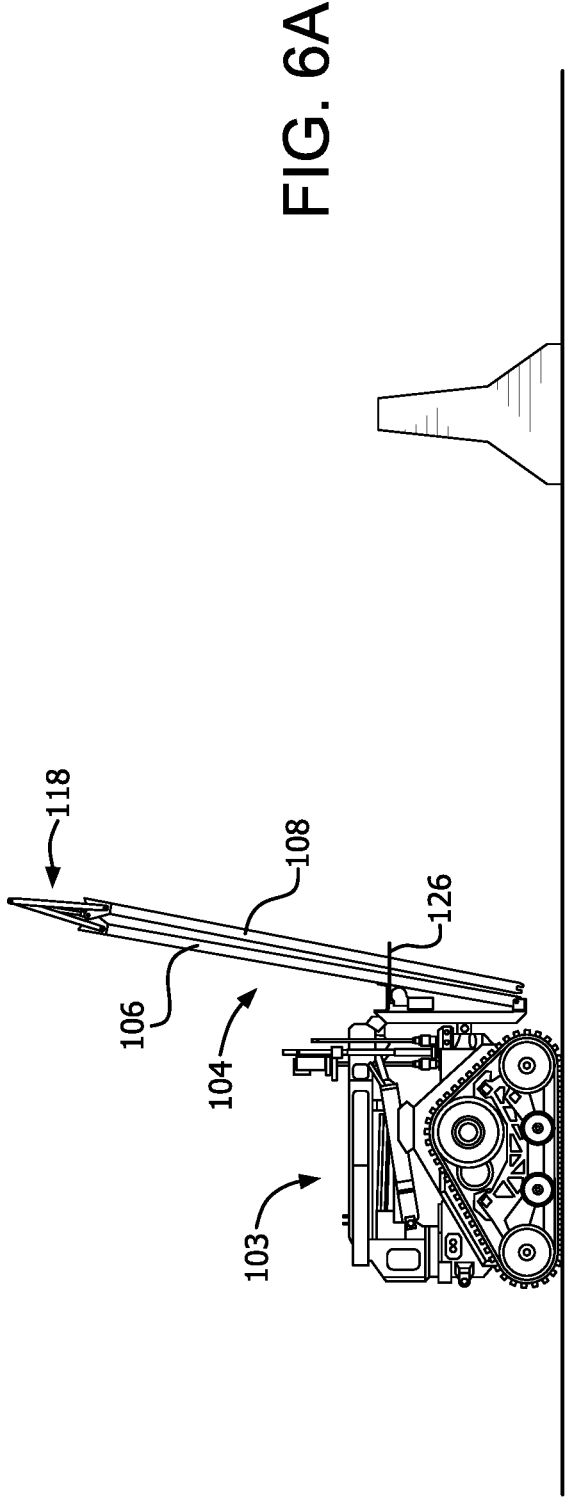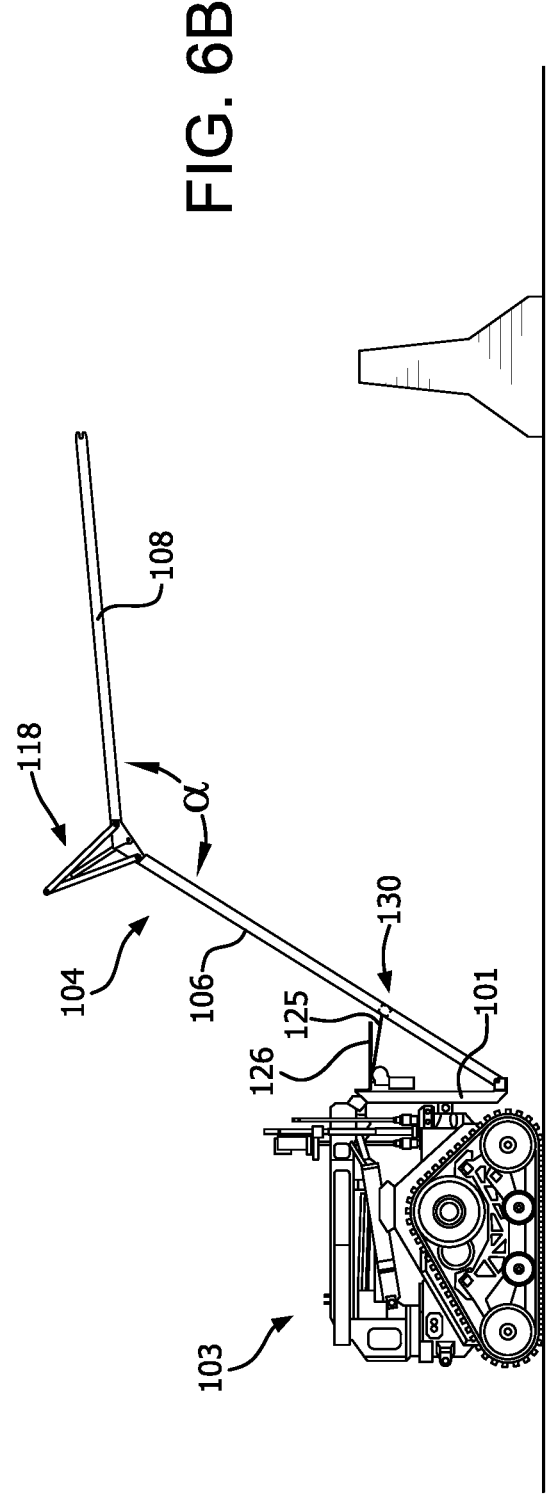

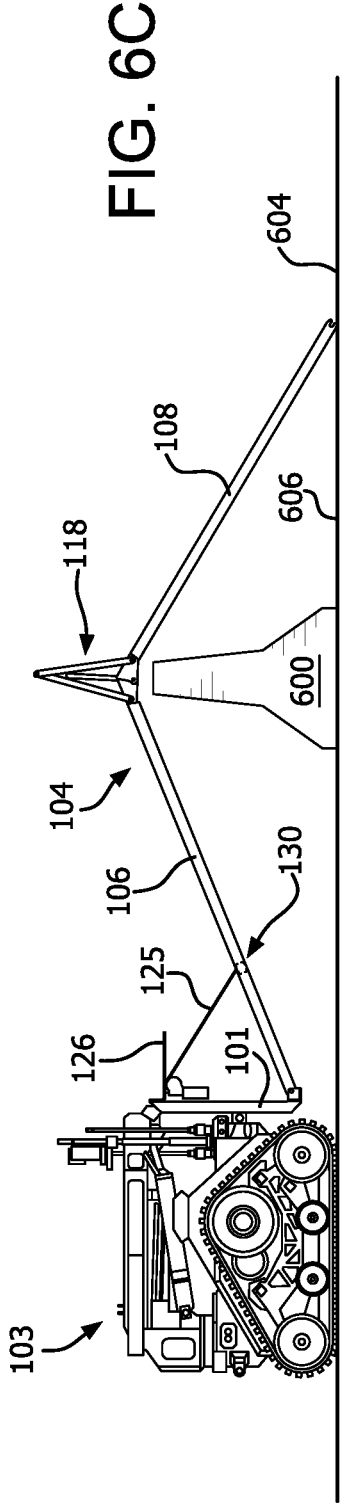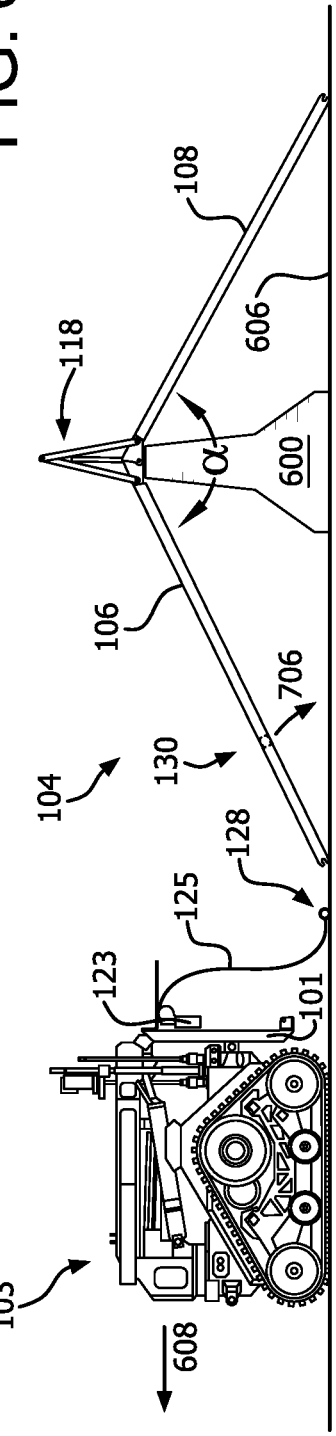

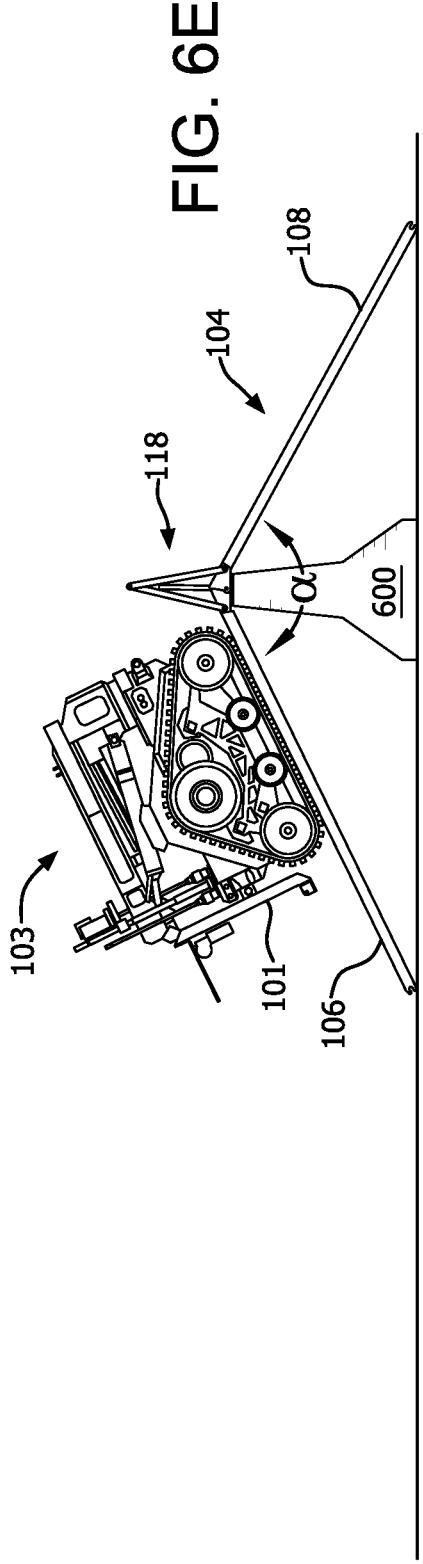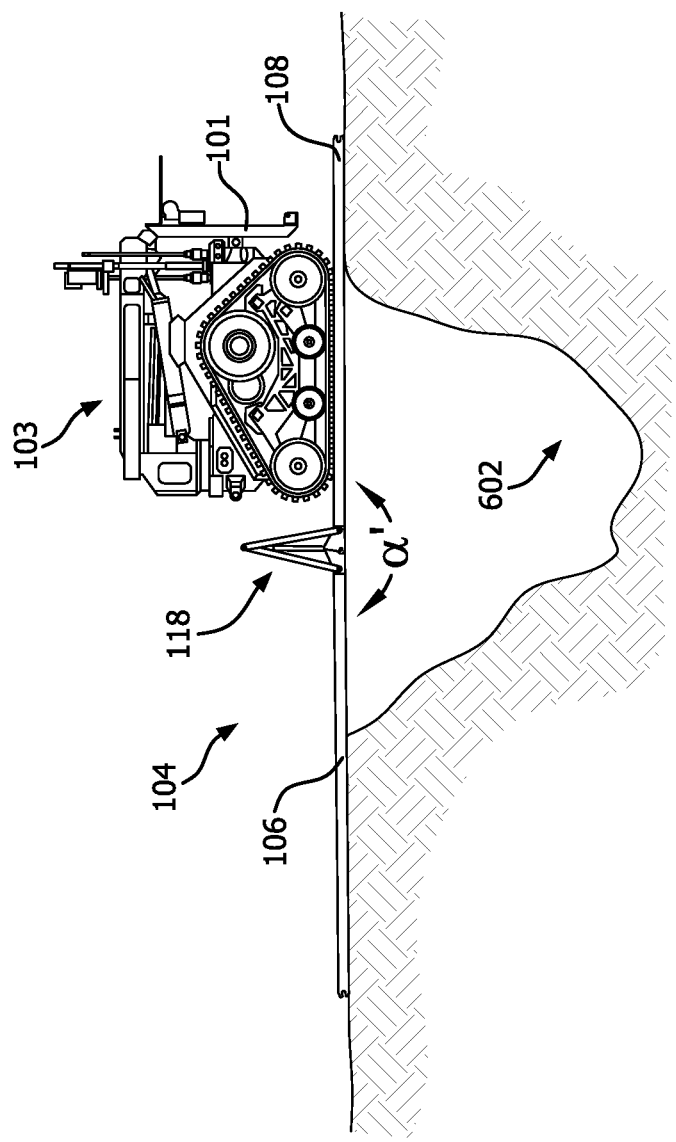

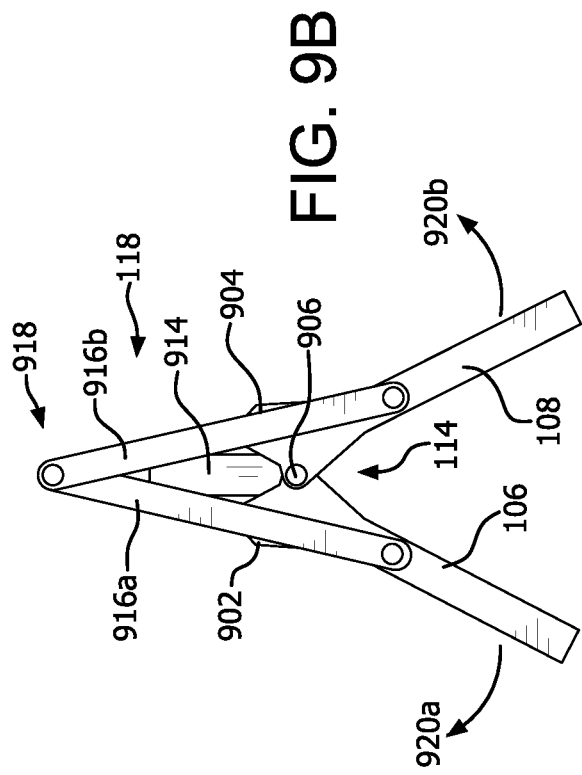
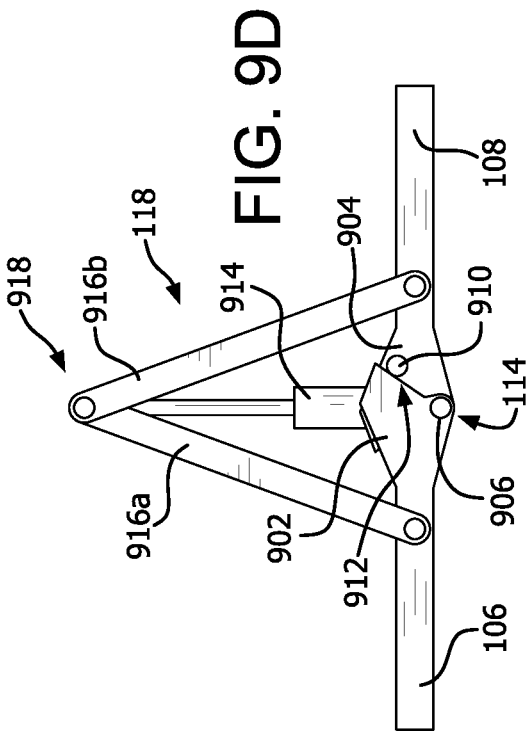
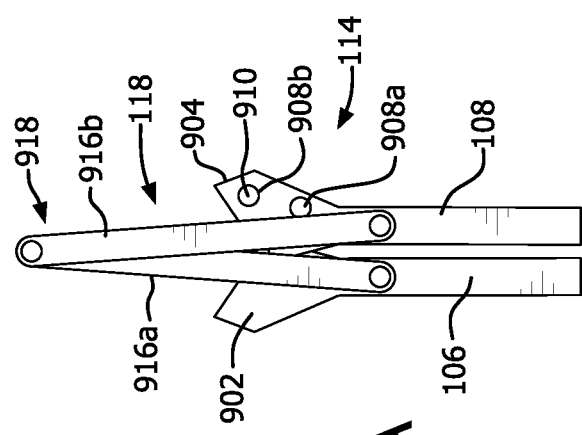
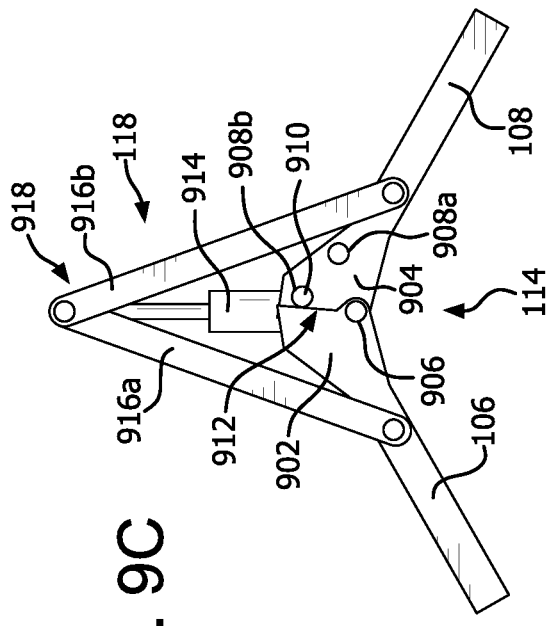

ROBOTIC BRIDGING SYSTEM

BACKGROUND

Statement of the Technical Field

The technical field concerns unmanned ground vehicles, and more particularly systems for improving the ability of unmanned ground vehicles to transit obstacles.

Description of the Related Art

The related art concerns unmanned ground vehicles (UGVs) and more particularly systems which improve the mobility of such UGVs in the presence of certain types of obstacles. UGVs are increasingly being used in a wide variety of roles and settings. These can include domestic, military and international applications where the UGV is used to perform certain tasks which are deemed too dangerous or are otherwise inappropriate for personnel or other types of manned vehicles. Examples include explosive ordnance disposal, situations involving chemical or biological threats, handling of hazardous materials (HAZMAT), countermine operations for disabling and/or removal of mines. In other scenarios UGVs can be used to facilitate transportation of equipment and armed platforms. Further, UGVs are sometimes used for surveillance/reconnaissance operations and/or use as electronic warfare platforms.

In many instances where UGVs are utilized, they can encounter obstacles which interfere with the ability of the UGV to transit a particular area. Accordingly, various improvements have been suggested to improve the mobility of UGVs in both urban and rural settings. For example, such enhancements have included UGVs with flippers of various types, including flippers with motorized tracks. While these conventional solutions can be useful in some situations, they are usually only helpful for overcoming obstacles of a certain limited size or type.

SUMMARY

This document concerns a robotic bridging system for a UGV. The bridging system includes a hinged bridge structure which is comprised of a first elongated span that extends from a first end to a second end opposed from the first end. A second elongated span is attached to the second end of the first elongated span by a hinge system. The hinge system defines a hinge axis which is aligned transverse to an elongated length of the first and second elongated spans. The hinged bridge structure also includes a spring bias assembly. The spring bias assembly is configured to urge rotation of the second elongated span about the hinge axis from a closed configuration to an open configuration. In the closed configuration, the second elongated span is adjacent to the first elongated span. In the open configuration the second elongated span forms an obtuse angle with the first elongated span.

The bridging system also includes a deployment support bracket, which is configured for attachment to a UGV. In some scenarios, the deployment support bracket can be configured to be removably attached to the UGV. The deployment support bracket includes a pivot member configured to pivotally support the first end of the first elongated span. A tension element deployment device is secured on the support bracket. The tension element deployment device is configured to selectively control a variable length of an extended portion of an elongated tension element. In some scenarios described herein, the tension element deployment device is a winch and the elongated tension element is a winch cable spooled on the winch. The elongated tension element is releasably secured at a distal end thereof to the first elongated span when the first elongates span is in a stowed position adjacent the deployment support bracket. The elongated tension element is releasably secured at a predetermined location on the first elongated span, which location is intermediate the first and second ends of the span.

The deployment support bracket advantageously includes a retention element which is configured to selectively prevent transition of the second elongated span from a closed configuration to the open configuration when the first elongated span is in the stowed position. In some scenarios, the retention element is configured to prevent release of the second elongated span when a tension force applied by the elongated tension element is applied to the first elongated span.

The hinged bridge structure is configured to automatically transition from a stowed configuration to a deployed configuration. In the stowed configuration, the first elongated span is in the stowed position and the second elongated span is in the closed position. In the deployed configuration the first elongated span is pivoted on the pivot member away from the stowed position, and the second elongated span is in the open position. Advantageously, the transition is exclusively in response to increasing the variable length of the extended portion of the tension element from a stowed length to an deployment length, which is longer than the stowed length.

More particularly, the hinged bridge structure and the deployment support bracket are responsive to extending the variable length of the tension element so as to cause the first elongated span to pivot about the first end. This action causes the retention element to concurrently release the second elongated span.

According to one aspect, the hinged bridge structure also includes a travel limiting element. The travel limiting element is configured to limit a maximum magnitude of the obtuse angle when the second elongated span is rotated about the hinge axis. In some scenarios, the travel limiting element is configured to selectively control the maximum magnitude of the obtuse angle to two or more predetermined obtuse angles.

In the robotic bridging system disclosed herein, the first end of the first elongated span is advantageously configured to be passively released from the pivot member and the deployment support bracket when a tension force exerted by the elongated tension element is removed. To facilitate this operation a catch disposed on the tension element can be configured to automatically release from a receiver structure in the first elongated span when a magnitude of a tension force applied by the elongated tension element is sufficiently reduced.

The solution presented also concerns a method for bridging an obstacle with a UGV bridging system as described. The method involves supporting a first end of the first elongated span of the hinged bridge structure on the deployment support bracket which is secured to a UGV. At the second end of the first elongated span opposed from the first end, the second elongated span is hingedly supported on the hinge system, whereby the hinge axis aligned transverse to an elongated length of the first and second elongated spans. The method further involves using a tension element to apply a tension force to the first elongated span at a location intermediate the first and second ends. The tension force secures the first elongated span in a stowed position adjacent the deployment support bracket.

The method further involves using a retention element disposed on the deployment support bracket to prevent a spring bias force acting on the second elongated span from causing the second elongated span to rotate about the hinge axis from the closed configuration to the open configuration. In some scenarios, the tension force which is applied to the first elongated span when in the stowed position can be used to indirectly facilitate retention of the second elongated span by the retention element.

In the method disclosed herein, the deploying process comprises pivoting the first elongated span about the first end, and concurrently releasing the second elongated span from the retention element in response to the extending. Thereafter, the travel limiting element is used to limit a maximum rotation of the second elongated span about the hinge axis relative to the first elongated span. The method can further involve setting the travel limit element in accordance with a user selectable magnitude of the obtuse angle. The deploying process further comprises continuing to pivot the first elongated span about the first end by further extending the tension element until tension is relieved on the tension element. The first end of the first elongated span is then passively released from a pivot structure disposed on the deployment support bracket. For example, this part of the process can involve automatically disconnecting the tension element from a receiver in the first elongated span by reducing a magnitude of tension applied by the tension element.

BRIEF DESCRIPTION OF THE DRAWINGS

This disclosure is facilitated by reference to the following drawing figures, in which like numerals represent like items throughout the figures, and in which:

FIGS. 6A-6F are a series of drawings which are useful for understanding a deployment process of a hinged bridge structure associated with a robotic bridging system for a UGV.

FIGS. 9A-9D are a series of drawings which are useful for understanding a spring-biased hinge system and a travel limiter associated with the hinged bridge structure.

DETAILED DESCRIPTION

Figure 1:
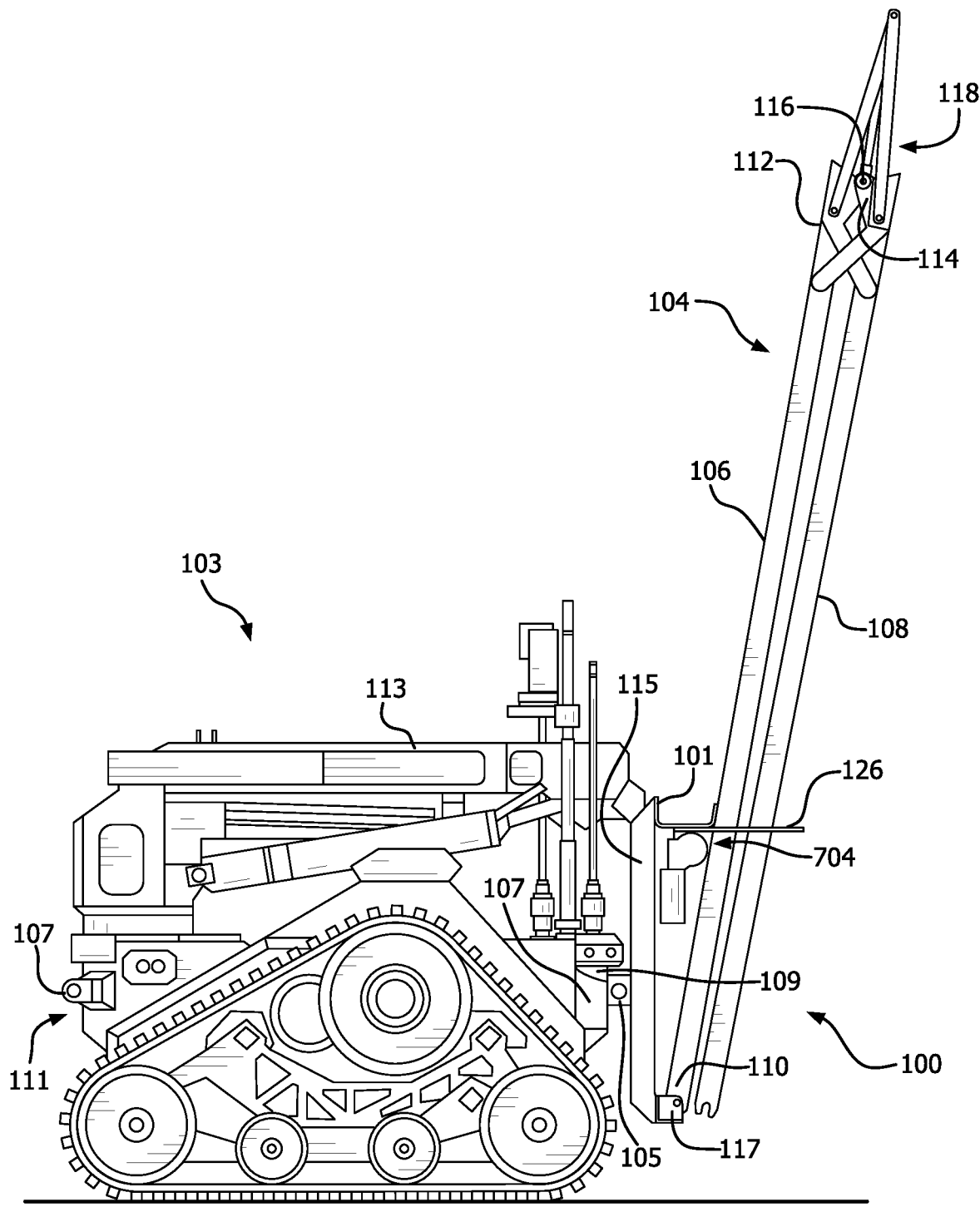
FIG. 1 is a side view which is useful for understanding a robotic bridging system for a UGV, shown in a stowed configuration.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

The methods and/or systems disclosed herein facilitate an improved ability for UGVs to travel over certain types of obstacles. The solution involves a robot-mounted obstacle bridging payload is flexible for handling multiple types of obstacles, can be deployed with a robot remotely, is simple, low-cost, and lightweight. The solution is configured so that it does not require a dedicated UGV bridging vehicle, but can be instead be removably mounted on any conventional UGV when needed. Further, the solution facilitates mobility over a variety of different types of obstacles including gaps, steps and structures which project above ground level.

FIGS. 1-5 are useful for understanding a robotic bridging system for a UGV. The robotic bridging system 100 includes a deployment support bracket 101, which is advantageously configured so that it can be removably attached to a UGV 103. As such, the deployment support bracket is comprised of a rigid structural frame 115, which may have a rectangular configuration as shown. As such, the rigid structural frame can in some implementations include an upper and lower cross-member 129, 119 and vertical cross-members 131a, 131b. One or more attachment members 105 can be provided on the rigid structural frame. These attachment members can be used to removably attach the hinged bridge structure to a UGV 103. For example, a UGV 103 can have one or more front and rear facing hitch points 107. These hitch points can be used to facilitate a secure but removable attachment of the hinged bridge structure to the UGV. Pins, bolts or other types of removable fasteners (not shown) can be used to facilitate such an attachment. The attachment members 105 provided on the bridging attachment system are advantageously arranged to support the deployment support bracket 101 so that the robotic bridging system is disposed on a front face 109 or rear face 111 of a UGV. An advantage of mounting the robotic bridging system 100 to the front or rear face of the UGV is that these areas are least likely to interfere with stowage of a robotic arm 113 and other UGV systems which are commonly disposed on a top facing portion of the UGV chassis.

The deployment support bracket 101 is configured to support and deploy a hinged bridge structure 104. As such, the deployment support bracket 101 can include one or more pivot members 117. In some scenarios, these pivot members 117 can be disposed on a lower frame cross-member 119 which extends in a direction aligned with a pivot axis 124. Each of the pivot members can include a pivot axle 121 on which the hinged bridge structure 104 is supported. The deployment support bracket 101 also serves as a mount for a tension element deployment device 123. In some scenarios the deployment device 123 may be a motorized winch which controls a variable length L of an elongated tension element 125 (e.g., a winch cable) which is deployed by rotating a spool 127 on which the winch cable is wound. Still, it should be appreciated that the tension element and the deployment device are not limited to the arrangement shown. In other scenarios, a rigid extendable arm (not shown) could also be used for this purpose. Such an extendable arm could be pneumatically controlled or mechanically deployed by an actuator. The deployment support bracket 101 can also include one or more retention elements 126. In some scenarios, each of the retention elements can be implemented as a U-shaped arm which pivots about a respective pivot axis 135a, 135b. The function of these various components are discussed below in greater detail.

The hinged bridge structure 104 is comprised of a first elongated span 106 and a second elongated span 108. The first elongated span 106 extends from a first end 110 to a second end 112, which is opposed from the first end. Each of the elongated spans 106, 108 can be comprised of a rigid ladder-like structure defined by two or more stringers or rails 302, and a plurality of rigid cross-members 304 which extend transversely between the rails 302.

The second elongated span 108 is attached to the second end 112 of the first elongated span by a hinge assembly 114 which defines a hinge axis 116. The hinge axis 116 is aligned transverse to an elongated length of the first and second elongated spans. In some scenarios, the first and second elongated spans can have similar configurations so that either the first or the second elongated span can be supported in the deployment support bracket. As best understood with reference to FIG. 5, a first end 110 of the first elongated span can include one or more concave end faces 122. In some scenarios, each of the concave end faces 122 can be respectively disposed on pivot foot 133 as shown. The concave end faces 122 are each shaped and dimensioned to receive a corresponding pivot axle 121. Consequently, the first elongated span 106 when supported on the deployment support bracket can pivot on the concave end faces about a pivot axis 124 in a direction indicated by arrows 502.

A spring bias assembly 118 is operatively coupled to the hinge assembly 114. The spring bias assembly is configured to urge rotation of the second elongated span about the hinge axis 116 from a closed configuration to an open configuration. The closed configuration is best understood with reference to FIGS. 1, 2 and 6A. In this closed configuration, the second elongated span 108 is disposed adjacent to the first elongated span 106. The open configuration can be understood with reference to FIGS. 3 and 6B-6D. In the open configuration the second elongated span 108 forms an obtuse angle α with respect to the first elongated span 106.

Figure 2:
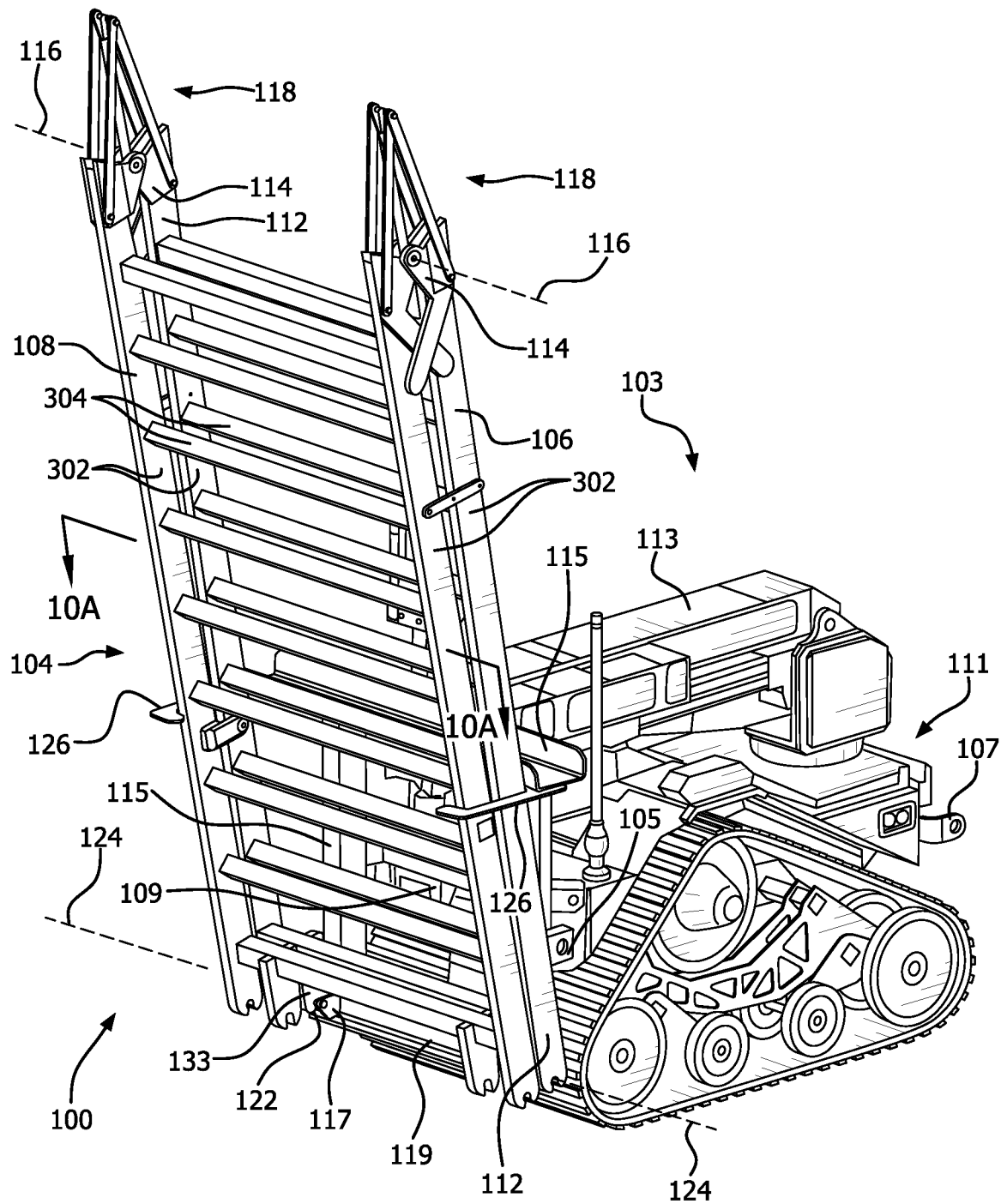
FIG. 2 is a perspective view of the robotic bridging system in FIG. 1.
Figure 3:
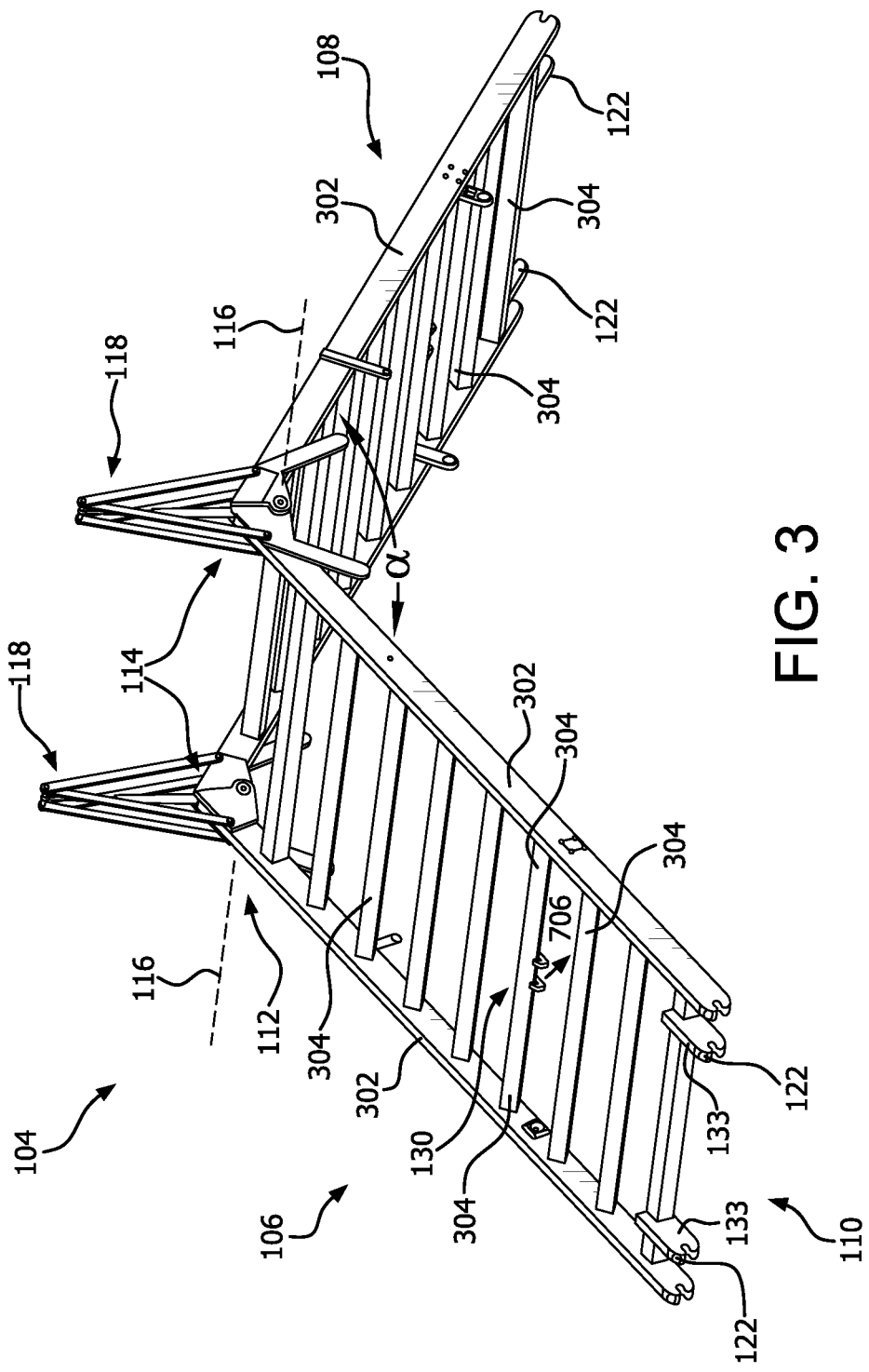
FIG. 3 is a drawing that is useful for understanding a hinged bridge structure.
Figure 4:
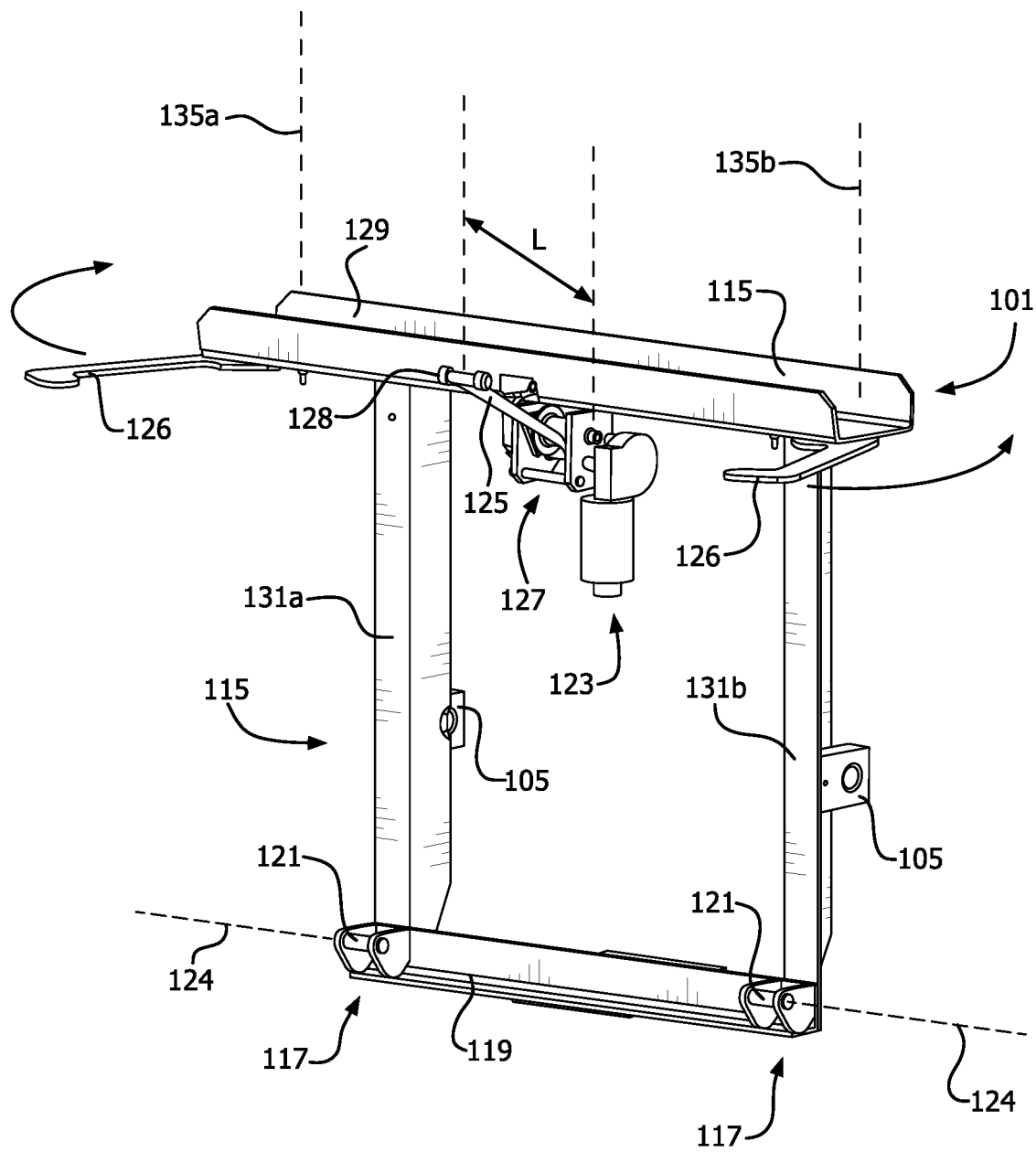
FIG. 4 is a drawing that is useful for understanding a deployment support bracket of a robotic bridging system.
Figure 5:
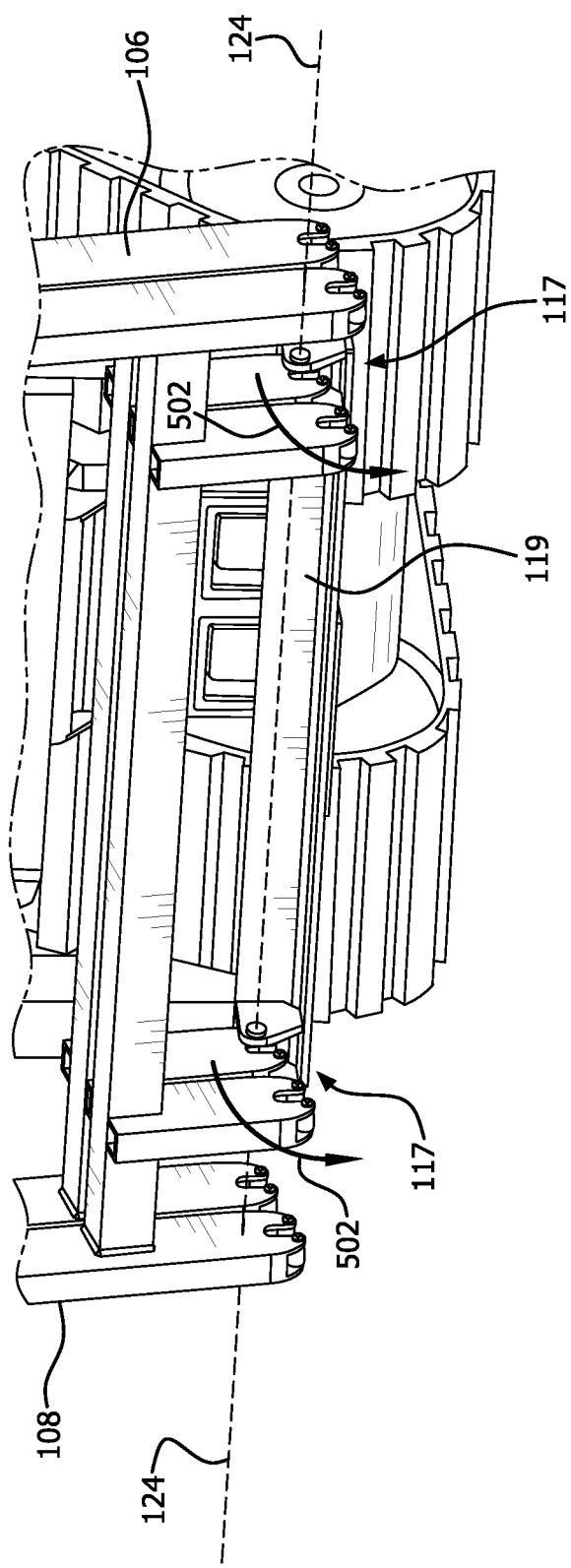
FIG. 5 is a drawing which is useful for understanding how a first end of a hinged bridge structure can pivot on a pivot member of the deployment support bracket.

As shown in FIG. 4. the tension element 125 includes a catch 128 disposed at an end thereof. The catch is comprised of a rigid component which is designed to fit snugly within a receiver structure 130 (see FIG. 3) disposed at a location along the length of the first elongated span 106. For example, the receiver structure can be disposed at a location along the length of the first elongated span that is intermediate the first and second ends 110, 112. The receiver structure 130 is advantageously configured to releasably secure the catch to the first elongated span 106. Accordingly, when the catch 128 is snugly positioned in the receiver structure 130, and the tension element 125 is fully retracted as shown in FIGS. 1 and 2, the first elongated span 106 is urged by the tension element toward the deployment support bracket 101. The elongated span 106 is advantageously maintained in this stowed position adjacent the deployment support bracket 101 when the hinged bridge structure is not in use or is being transported by the UGV. The retention elements 126 can selectively maintain the second elongated span 108 in the closed configuration when the first elongated span is in the stowed position.

A deployment process for the robotic bridging system will now be described with reference to FIGS. 6A-6F. The process can begin in FIG. 6A with supporting the first end 110 of the first elongated span 106 on the deployment support bracket 101. With the hinged bridge structure 104 supported on the deployment support bracket 101 in a stowed configuration the UGV 103 can be used to carry the robotic bridge system 100 over pavement or terrain to a location where an obstacle interferes with mobility. In the example shown in FIGS. 6A-6E, the obstacle 600 is a vertical barrier. In the example shown in FIG. 6F, the obstacle 604 is a gap in the ground surface or terrain over which the UGV is traveling.

In the stowed configuration show in FIG. 6A, the first elongated span 106 is in the stowed position and the second elongated span 108 is in the closed position. When the UGV is positioned a predetermined distance from the barrier 600, 602 a length of the tension element 125 is increased to allow the hinged bridge structure to transition from the stowed configuration shown in FIG. 6A to a partially deployed configuration shown in FIGS. 6B and 6C. In the partially deployed configuration, the first elongated span 106 is pivoted on the pivot member away from the stowed position, and the second elongated span 108 is in the open position. According to one aspect, the transition from stowed configuration to partially deployed configuration can be performed exclusively in response to increasing the variable length L of the extended portion of the tension element 125 from a stowed length to a deployment length.

During the deploying process, the hinged bridge structure 104 and the deployment support bracket 101 are responsive to extending the variable length of the tension element 125 to cause the first elongated span 106 to pivot about the first end 110. Concurrent with this operation, the retention element 126 is advantageously configured to release the second elongated span 108. This release allows the second elongated span 108 to pivot from its closed position to its open position in response to a bias force provided by spring assembly 118. The transition to the open position allows the second elongated span 108 to pivot or rotate away from the first elongated span to form an obtuse angle α between them. A travel limiting element (not shown in FIGS. 6A-6F) is used to limit a maximum rotation of the second elongated span about the hinge axis. As explained below in greater detail, the travel limit element can in some scenarios be set in accordance with a user selectable preference to define a magnitude of the obtuse angle α.

As the variable length of the tension element is further increased, the first elongated span 106 will continue to pivot about the first end 110 until a third end 604 of the second elongated span is resting upon a support surface 606 in the environment. This condition is illustrated in FIG. 6C. Thereafter, by further extending the length L of the tension element 125 tension is relieved on the tension element 125. During transport and deployment process shown in FIGS. 6A-6B, the force of gravity acting upon the hinged bridge structure 104 and/or the tension force applied by the tension element 125 will create a force vector which will retain the concave end faces 122 of the first elongated span in snug engagement with the pivot axles 121. However, once the hinged bridge structure is partially deployed with the third end 604 on the ground shown (as shown in FIG. 6C) the tension applied by the tension element 125 can be relieved by continuing to extend the length L of the tension element.

This operation will allow the first end 110 of the first elongated span 106 to be released from engagement with the pivot axles 121. In some scenarios, this releasing operation can also be facilitated by causing the UGV to back away from the hinged bridge structure in a direction indicated by arrow 608. Consequently, the hinged bridge structure 104 will be passively released from engagement with the deployment support bracket, without the need for human intervention and/or additional actuators disposed on the support bracket. After being released in this way, the first end 110 is allowed to drop to the ground surface 606 as shown in FIG. 6D. Concurrent with this passive release operation, the reduction or removal of tension from the tension element 125 can be used to cause the catch 128 to automatically disengage from the receiver 130 in the first elongated span 106. This scenario is also illustrated in FIG. 6D. At this point, the winch 123 can be operated to reduce the length of the tension element 125 (e.g., by re-spooling the winch line).

Once the hinged bridge structure 104 is free from the deployment support bracket 101 and the tension element 125 is disengaged from the receiver 130, the UGV 103 can utilize the deployed bridge structure to transition over the obstacle 600, 602. FIGS. 6E and 6F show the UGV traversing the fully deployed hinged bridge structure 104.

Figure 8:
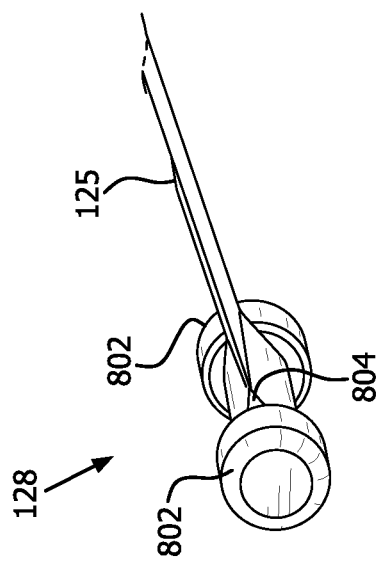
FIG. 8 is an enlarged view showing a catch which can be disposed on a cable end to facilitate a passive release of the hinged bridge structure.
Figure 7:
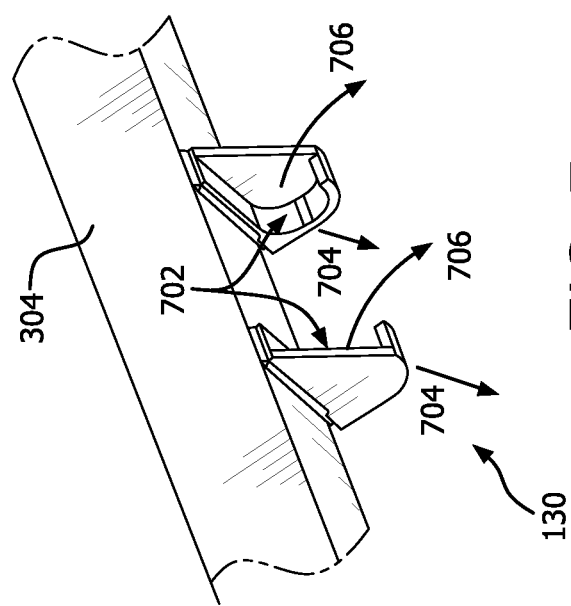
FIG. 7 is a drawing which is useful for understanding a releasable catch system which can be used to facilitate a passive release of a hinged bridge structure.

The passive disengagement of the catch 128 from the receiver structure 130 will now be described in greater detail in relation to FIGS. 7 and 8 which show one example of a passive release configuration of these elements. As shown in FIG. 7, the receiver structure 130 can comprise one or more concave retention faces 702. The catch 128 can be comprised of one or more cylindrical pucks 802 which in some scenarios may be connected by an elongated cross-member 804. The one or more cylindrical pucks 802 are sized and shaped so that they are snugly received in a space defined by the concave retention faces 702. When the catch 128 is snugly positioned in the receiver structure 130, and the tension element 125 is fully retracted as shown in FIGS. 1 and 2, the tension element 125 will exert a force on a retention face(s) 702 in a direction indicated by arrows 704 (See FIGS. 1 and 7). When tension is applied in this direction, the catch 128 will urge the first elongated span toward the support bracket as shown in FIGS. 1, 2 and 6A. However, when the hinged bridge structure is deployed as shown in FIG. 6D, the catch 128 will drop from the space defined by the concave retention faces 702 in the direction indicated by arrow 706 (see FIGS. 6D and 7). Of course, other solutions are possible in this regard and the embodiments are not limited to the particular catch and receiver configuration shown in FIGS. 7 and 8.

An example of a hinge assembly 114 and associated spring bias assembly 118 is shown in greater detail in FIGS. 9A-9D. The hinge assembly 114 can include a first knuckle 902 and a second knuckle 904. The two knuckles 902, 904 are rotatably connected by means of a hinge pin 906 which is aligned with the hinge axis 116. Second knuckle 904 can include one or more apertures 908a, 908b which are each configured for receiving a removable limiter pin 910. As shown in FIGS. 9C and 9D the limiter pin can be configured to engage a limit face 912 associated with the first knuckle 902 so as to limit the maximum rotation of the second elongated span 108 relative to the first elongated span 106. The apertures 908a, 908b are advantageously located at different locations on the second knuckle. Consequently, a limiter pin 910 inserted in aperture 908a will engage the limit face 912 at a different angles of rotation of the two knuckles, as compared to when the limiter pin is inserted in aperture 908b. This configuration allows the obtuse angle α between the two elongated spans to be chosen by a user to best accommodate a particular obstacle 600, 602 which is to be traversed. For example, FIG. 6E shows a first scenario in which the hinged bridge structure in the deployed configuration forms a first angle α to accommodate an obstacle 600 in the form of a traffic barrier. In contrast, FIG. 6F shows a second scenario in which the hinged bridge structure in the deployed configuration forms a second angle α' to accommodate a second obstacle 602 comprising a gap in a road surface.

Of course, the foregoing arrangement represents just one example of how the hinge assembly can be configured to facilitate different limit angles and the solution is not intended to be limited in this regard. In fact, the exact limiter arrangement is not critical provided that it allows the two elongated spans to be locked in at least one position to set an obtuse angle α.

FIGS. 9A-9D are useful for understanding an exemplary spring bias assembly 118. The spring bias assembly will include at least one spring element 914, which in the example is a gas spring. The spring element 914 can include first and second working ends. A first working end of the spring (not shown) can be attached to the hinge pin 906. The spring bias assembly can also include a set of links 916a, 916b which are pivotally connected at an apex 918. The second working end of the spring element 914 is pivotally coupled to the links 916a, 916b at the apex 918. With the foregoing configuration, a spring force exerted by the spring at the apex 918 and at the hinge pin 906 will urge the first and second elongated spans 106, 108 in the directions indicated by arrows 920. It should be noted that the exact configuration of the spring bias assembly is not critical provided that it urges the first and second spans in the directions indicated by arrows 920a, 920b. Accordingly, the arrangement shown in FIGS. 9A-9D should be understood as one possible example of a spring bias assembly and is not intended to limit the solution presented herein.

The retention elements are configured to prevent the second elongated span from moving from a closed position to an open position when the hinged bridge structure is stowed for transport. In the example shown in FIGS. 1-5, the retention elements 126 are configured as U-shaped swing arms disposed on an upper cross-member 129 of the rigid structural frame 115. The U-shaped swing arms are pivotally mounted at one end thereof to the cross-member 129 so that they pivot on axes 135a, 135b as shown in FIGS. 10A-10B.

Figure 10A:
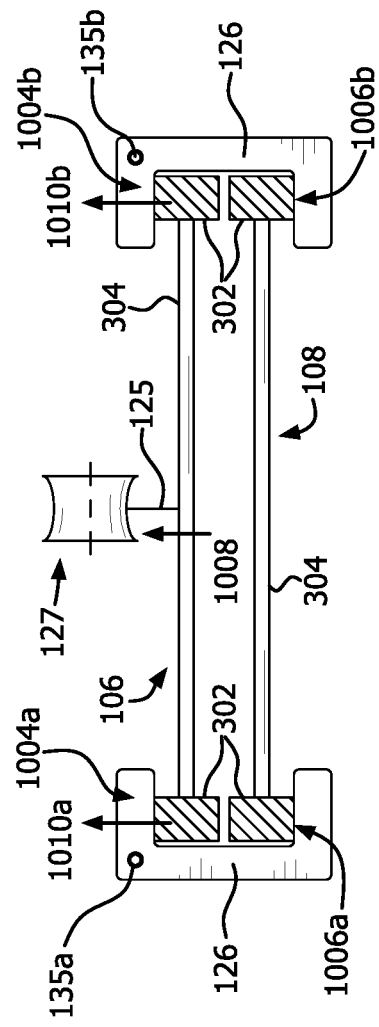
FIGS. 10A-10C are a series of drawings which are useful for understanding a retention element which can be used to prevent transition of the second elongated span from closed configuration to the open configuration when the first elongated span is in the stowed position.

In FIG. 10A the rails 302 of the first elongated span 106 exert a force 1010a, 1010b against rear faces 1004a, 1004b of the U-shaped swing arms 126. The first elongated span 106 is held in this stowed position as a result of tension element 125 exerting a tension force 1008 upon the first elongated span. Forces 1010a, 1010b urge the swing arms 126 to their retention position shown in FIG. 10A. In this condition, the front faces 1006a, 1006b of the swing arms are effectively rotated to a position which prevent the second elongated span 108 from pivoting about axis 116 from its closed position shown in FIG. 10A.

Figure 10B:
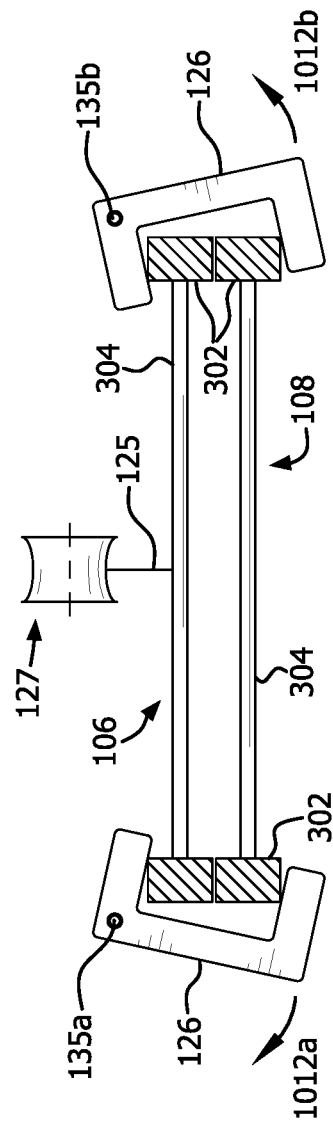
Figure 10C:
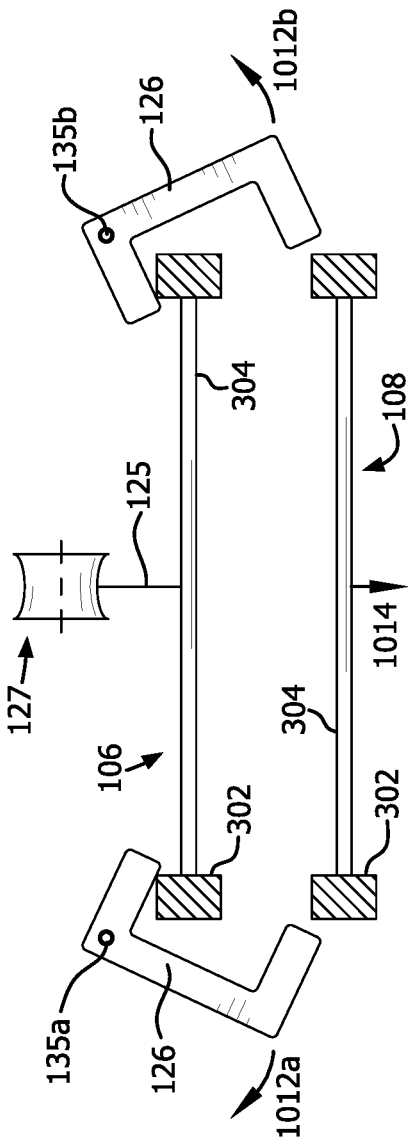

In FIG. 10B the tension element 125 has increased in length relative to FIG. 10A such that first swing arms are allowed to pivot in directions 1012a, 1012b. This process continues in FIG. 10C, whereby the front faces 1006a, 1006b continue pivoting until the second elongated span is free. Once free of the constraints imposed by the swing arms 126 the second elongated span can transition in direction 1014 (as a result of a spring bias force) by pivoting from its closed position to its open position.

Figure 11:
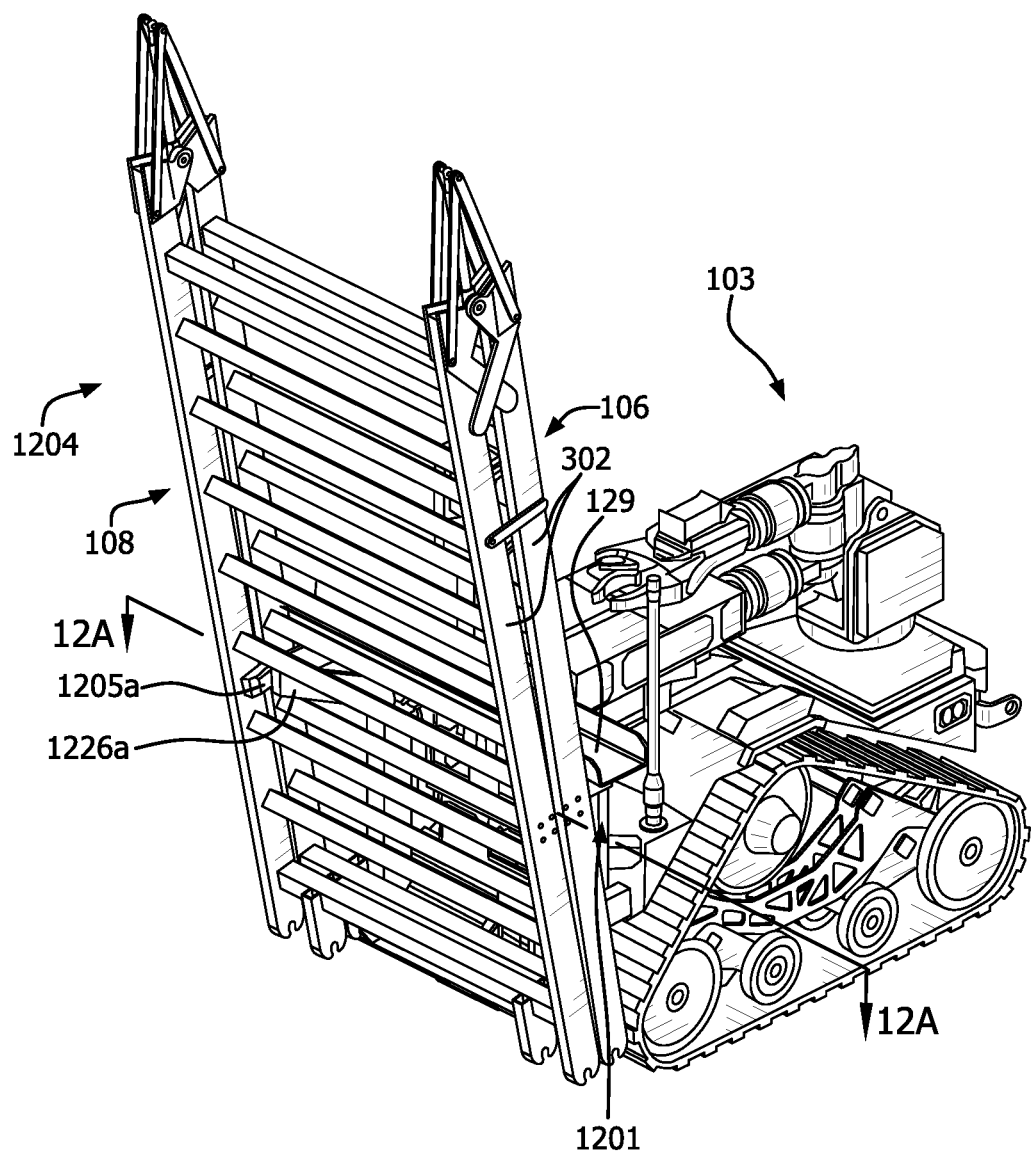
FIG. 11 is a perspective view which shown an alternative type of retention element.
Figure 12A:
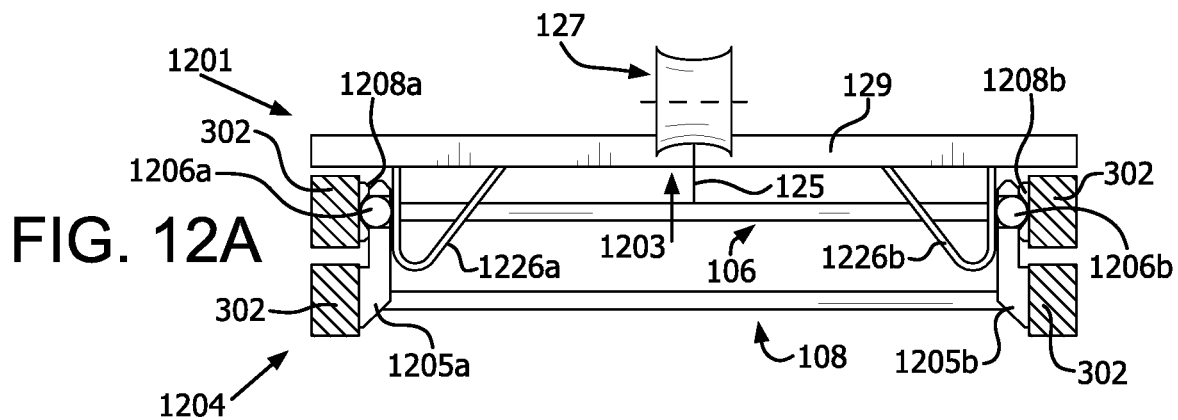
FIG. 12A-12C are a series of drawings which are useful for understanding the alternative type of retention element shown in FIG. 11.

An alternative implementation of a retention element is shown in FIGS. 11 and 12 in which a UGV has a support bracket 1201 which is similar to support bracket 101. As such, the support bracket 1201 includes an upper cross-member 129. The upper cross-member 129 in this implementation supports fixed retention arms 1226a, 1226b. The hinged bridge structure 1204 is urged into engagement with fixed retention arms 1226a, 1226b and this engagement is facilitated by a tension force 1203 applied by tension element 125. The fixed retention arms 1226a, 1226b each respectively engage a movable ball 1206a, 1206b. Movable balls 1206a, 1206b are respectively captured in bores 1207a, 1207b disposed in the cantilevered wing members 1205a, 1205b. The wing members 1205a, 1205b are fixed to inner faces of the rails 302 comprising the second elongated span 108. When the hinged bridge structure is in the stowed configuration shown in FIG. 12A, the retention arms urge 1226a, 1226b urge the balls 1206a, 1206b into ball cups 1208a, 1208b which are fixed to first elongated span 106 on an inner face of the rails 302. The balls 1206a, 1206b are firmly retained in the ball cups 1208a, 1208b by the fixed retention arms 1226a, 1226b such that the second elongated span is unable to spring from its closed position shown in FIG. 12A.

Figure 12B:
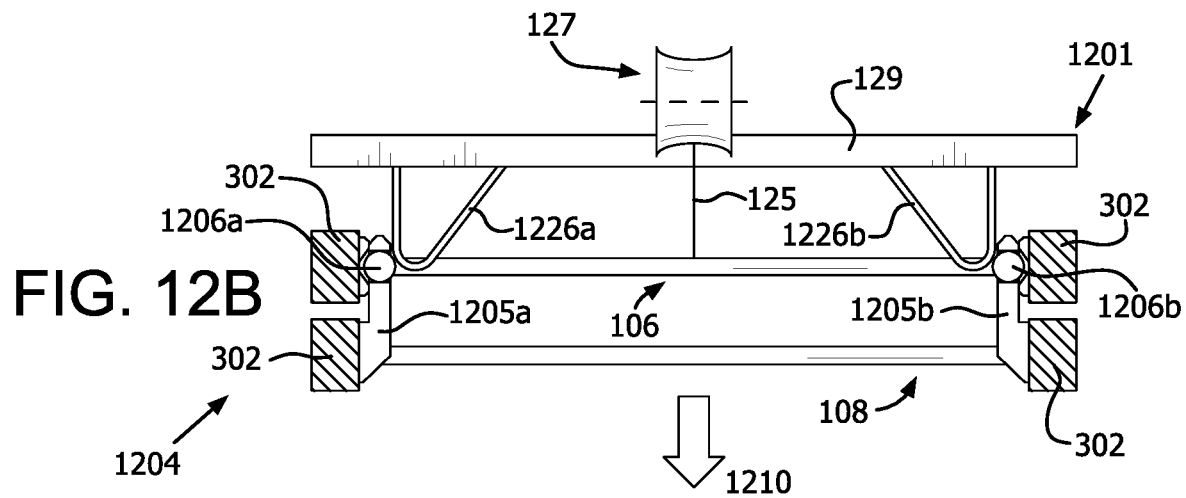
Figure 12C:
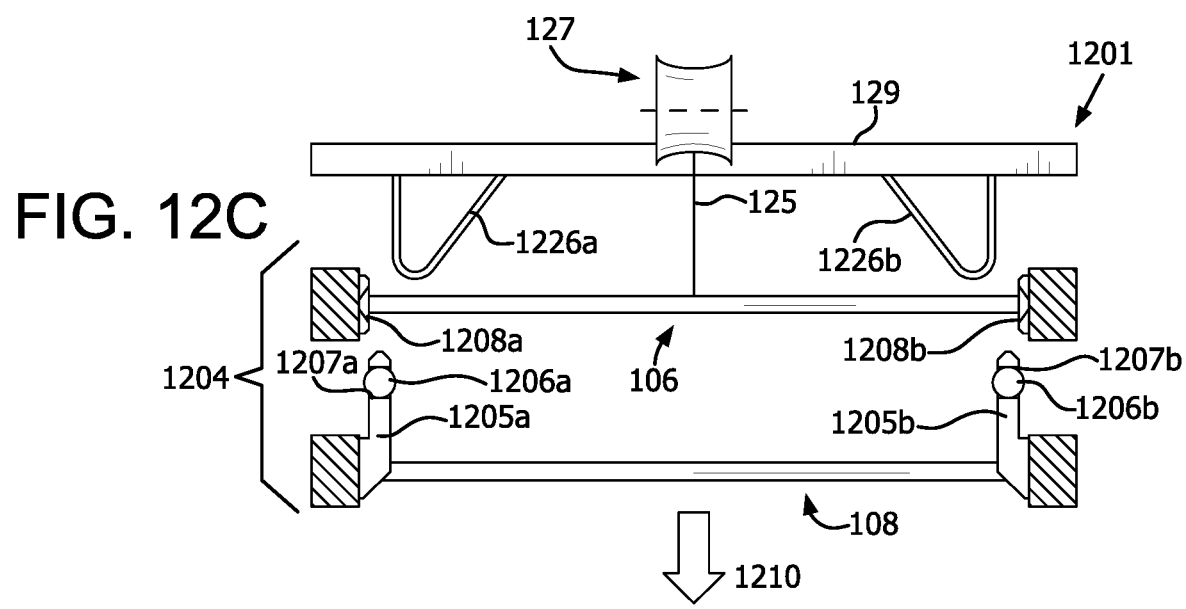

In FIG. 12B the length of the tension element 125 is increased whereby the hinged bridge structure 1201 begins to pivot away from the upper cross-member 129 of the support bracket, in the direction indicated by arrow 1210. This movement allows faces of the fixed retention arms 1226a, 1226b to slide along the wing members 1205a, 1205b until they finally disengage from the balls 1206a, 1206b. At this point, the force applied by the retention arms, which had retained the balls 1206a, 1206b in place in the ball cups 1208a, 1208b, is removed. The balls 1206a, 1206b are free to move out of the ball cups, thereby allowing the second elongated span 108 to spring away from the first elongated span 106, as is shown in FIG. 12C. Of course, other configurations of the retention elements are also possible and all such alternatives are intended to be included within the scope of the solution presented herein.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for bridging an obstacle with an unmanned ground vehicle (UGV) bridging system, comprising:
    supporting a first end of a first elongated span of a hinged bridge structure on a deployment support bracket which is secured to a UGV;
    at a second end of the first elongated span opposed from the first end, hingedly supporting a second elongated span on a hinge system having a hinge axis aligned transverse to an elongated length of the first and second elongated spans;
    using a tension element to apply a tension force to the first elongated span at a location intermediate the first and second ends to secure the first elongated span in a stowed position adjacent the deployment support bracket;
    using a retention element disposed on the deployment support bracket to prevent a spring bias assembly, which is coupled to the hinge system, from urging rotation of the second elongated span about the hinge axis from a closed configuration in which the second elongated span is adjacent to the first elongated span to an open configuration in which the second elongated span forms an obtuse angle with the first elongated span; and
    deploying the hinged bridge structure by extending a length of the tension element.

2. The method according to claim 1, wherein the deploying comprises pivoting the first elongated span about the first end, and concurrently releasing the second elongated span from the retention element in response to the extending.

3. The method according to claim 2, wherein the deploying operation comprises using a travel limiting element to limit a maximum rotation of the second elongated span about the hinge axis relative to the first elongated span.

4. The method according to claim 1, further comprising continuing to pivot the first elongated span about the first end by further extending the tension element until tension is relieved on the tension element.

5. The method according to claim 4, further comprising passively releasing the first end of the first elongated span from a pivot structure disposed on the deployment support bracket.

6. The method according to claim 4, further comprising automatically disconnecting the tension element from a receiver in the first elongated span by reducing a magnitude of tension applied by the tension element.

7. The method according to claim 1, further comprising using the tension force which is applied to the first elongated span when in the stowed position to indirectly facilitate retention of the second elongated span by the retention element.

8. The method according to claim 1, further comprising controlling the length of the tension element using a rotating spool which is controlled by an actuator.

9. A method for bridging an obstacle with an unmanned ground vehicle (UGV) bridging system, comprising:
    supporting a first end of a first elongated span of a hinged bridge structure on a deployment support bracket which is secured to a UGV;
    at a second end of the first elongated span opposed from the first end, hingedly supporting a second elongated span on a hinge system having a hinge axis aligned transverse to an elongated length of the first and second elongated spans;

using a tension element to apply a tension force to the first elongated span at a location intermediate the first and second ends to secure the first elongated span in a stowed position adjacent the deployment support bracket;

using a retention element disposed on the deployment support bracket to prevent a spring bias force acting on the second elongated span from causing the second elongated span from rotating about the hinge axis from a closed configuration in which the second elongated span is adjacent to the first elongated span to an open configuration in which the second elongated span forms an obtuse angle with the first elongated span; and deploying the hinged bridge structure by extending a length of the tension element, where the deploying comprises (i) pivoting the first elongated span about the first end, (ii) concurrently releasing the second elongated span from the retention element in response to the extending, and (iii) using a travel limiting element to limit a maximum rotation of the second elongated span about the hinge axis relative to the first elongated span; and selectively setting the travel limiting element in accordance with a user selectable magnitude of the obtuse angle.

10. A robotic bridging system for a UGV, comprising;

a hinged bridge structure comprising
- a first elongated span which extends from a first end to a second end opposed from the first end;
- a second elongated span attached to the second end of the first elongated span by a hinge system which defines a hinge axis aligned transverse to an elongated length of the first and second elongated spans;
- a spring bias assembly configured to urge rotation of the second elongated span about the hinge axis from a closed configuration in which the second elongated span is adjacent to the first elongated span to an open configuration in which the second elongated span forms an obtuse angle with the first elongated span; and a deployment support bracket configured for attachment to a UGV, the deployment support bracket including
- a pivot member configured to pivotally support the first end of the first elongated span;
- a tension element deployment device configured to selectively control a variable length of an extended portion of an elongated tension element which is releasably secured at an end thereof to the first elongated span at a location intermediate the first and second ends when the first elongates span is in a stowed position adjacent the deployment support bracket; and
- a retention element configured to selectively prevent transition of the second elongated span from closed configuration to the open configuration when the first elongated span is in the stowed position.

11. The robotic bridging system according to claim 10, wherein the hinged bridge structure is configured to transition from a stowed configuration in which the first elongated span is in the stowed position and the second elongated span is in the closed position, to a deployed configuration in which the first elongated span is pivoted on the pivot member away from the stowed position, and the second elongated span is in the open position.

12. The robotic bridging system according to claim 11, wherein the transition is exclusively in response to increasing the variable length of the extended portion of the tension element from a stowed length to an deployment length longer than the stowed length.

13. The robotic bridging system according to claim 10, wherein the hinged bridge structure and the deployment support bracket are responsive to extending the variable length of the tension element to cause the first elongated span to pivot about the first end, and cause the retention element to concurrently release the second elongated span.

14. The robotic bridging system according to claim 11, further comprising a travel limiting element configured to limit a maximum magnitude of the obtuse angle when the second elongated span is rotated about the hinge axis.

15. The robotic bridging system according to claim 14, wherein the travel limiting element is configured to selectively control the maximum magnitude of the obtuse angle.

16. The robotic bridging system according to claim 10, wherein the first end of the first elongated span is configured to be passively released from the pivot member and the deployment support bracket when a tension force exerted by the elongated tension element is removed.

17. The robotic bridging system according to claim 10, wherein a catch disposed on the tension element is configured to automatically release from a receiver structure in the first elongated span when a magnitude of a tension force applied by the elongated tension element is sufficiently reduced.

18. The robotic bridging system according to claim 10, wherein the retention element is configured to prevent release of the second elongated span when a tension force applied by the elongated tension element is applied to the first elongated span.

19. The robotic bridging system according to claim 10, wherein the tension element deployment device is a winch and the tension element is a winch cable spooled on the winch.

20. The robotic bridging system according to claim 10, wherein the deployment support bracket is configured to be removably attached to a UGV.

* * * * *